United States Patent [19]

Ogawa et al.

[11] Patent Number: 4,886,850

[45] Date of Patent: Dec. 12, 1989

[54] RUBBER COMPOSITIONS AND PNEUMATIC TIRES USING THE SAME

[75] Inventors: Masaki Ogawa; Yasuro Shiomura; Toshiki Takizawa, all of Kodaira, Japan

[73] Assignee: Bridgestone Corporation, Tokyo, Japan

[21] Appl. No.: 238,673

[22] Filed: Aug. 31, 1988

Related U.S. Application Data

[62] Division of Ser. No. 46,352, May 6, 1987, Pat. No. 4,801,641.

[30] Foreign Application Priority Data

Jun. 17, 1986 [JP] Japan ................................ 61-139287

[51] Int. Cl.$^4$ ........................ C08K 3/04; C08K 3/26; C08L 9/00; C08L 23/16
[52] U.S. Cl. ............................ 524/413; 152/209 R; 152/525; 524/426; 524/430; 524/495; 524/518; 524/526
[58] Field of Search ............... 524/518, 525, 495, 426, 524/413, 430; 152/209 R, 525

[56] References Cited

U.S. PATENT DOCUMENTS

| | | | |
|---|---|---|---|
| 3,830,881 | 8/1974 | Woods et al. | 525/211 |
| 3,927,144 | 12/1975 | Hayashi et al. | 525/211 |
| 4,166,083 | 8/1979 | Ueda et al. | 524/518 |
| 4,485,205 | 11/1984 | Fujimaki et al. | 524/518 |
| 4,645,793 | 2/1987 | Von Hellens et al. | 524/518 |

*Primary Examiner*—Allan M. Lieberman
*Attorney, Agent, or Firm*—Sughrue, Mion, Zinn, Macpeak and Seas

[57] ABSTRACT

A rubber composition having improved weather resistance, thermal resistance, resistance to crack growth and wear resistance comprises not less than 20 parts by weight of a rubber compound mainly of ethylene, propylene and diene and satisfying all of particular requirements. Further, the rubber composition is applied to a tread and/or a sidewall of a pneumatic tire for improving a tire appearance.

22 Claims, No Drawings

RUBBER COMPOSITIONS AND PNEUMATIC TIRES USING THE SAME

This is a Division of application Ser. No. 07/046,352 filed 5/6/87, now U.S. Pat. No. 4,801,641.

BACKGROUND OF THE INVENTION

1. Field of the Invention

This invention relates to a rubber composition containing rubber composed mainly of ethylene, propylene and diene and having improved weather resistance, thermal resistance, resistance to crack growth and wear resistance. Further, it relates to pneumatic tires, particularly large size tires having considerably improved appearance and retreading life by using the above rubber composition in a tire sidewall as well as pneumatic tires having considerably improved appearance and resistance to groove cracking by using the above rubber composition in a tire tread.

2. Related Art Statement

Heretofore, three has been developed a method wherein rubber composed mainly of ethylene and propylene is copolymerized with a third ingredient such as dicyclopentadiene, ethylidene norbornene, 1,4-hexadiene or the like for curing the rubber with sulfur. The resulting terpolymer rubber (EPDM) has improved weather resistance and thermal resistance because there is no cutting of the main chain due to chemical attack of ozone or the like owing to the absence of double bonds in the main chain.

However, the resistance to crack growth and wear resistance are fairly inferior as compared with those of diene rubber. Further, the terpolymer rubber is poor in the covulcanizability with diene rubber and the application for rubber articles is considerably restricted.

In the field of pneumatic tires, the rubber composition for use in a tire sidewall has frequently been composed of a blend of natural rubber, butadiene rubber (BR) and styrene-butadiene copolymer rubber (SBR). However, the use of BR having an excellent bending durability is increasing as a recent trend. Furthermore, the blend of natural rubber and BR is dominant over the world, wherein the blending ratio of BR becomes not less than 50%. Since the rubber composition composed of only the above diene rubber is easily apt to be oxidized by oxygen, ozone or the like, it is usually compounded with a strong amine series antioxidant and a paraffinic wax for preventing the oxidation of the rubber composition. In new tires made from the compounded rubber composition, there is no problem as to the weather resistance, but the effective amount of the antioxidant in the rubber composition is decreased at the last use stage or in the long-period use based on retreading to cause ozone cracks and the like. The latter problem is highlighted as the tire performances are considerably improved.

As countermeasures for solving this problem, there are considered a method of increasing the amount of amine series antioxidant, a method of using an antioxidant having a long life, a method of using a reactive antioxidant capable of reacting with a main chain of rubber, and so on. However, increasing the amount of amine series antioxidant results in only slightly improved durability Further, the use of a long-life antioxidant or reactive antioxidant only slightly improves age resistance.

On the other hand, it has been attempted to use rubber containing no or a little diene ingredient and having substantially no double bond in its main chain (hereinafter referred to as non-diene rubber) so as not to use the antioxidant. Such a non-diene rubber includes ethylene-propylene-diene terpolymer rubber (EPDM), halogenated butyl rubber, chloroprene rubber and the like, but is rarely practised at the present because the bending durability and resistance to crack growth are considerably poor as compared with those of the diene rubber.

Lately, it is strongly demanded to improve the appearance of the tire itself in addition to the aforementioned problem. That is, when the rubber composition for the tire sidewall contains large amounts of amine series antioxidant and paraffinic wax as previously mentioned, the antioxidant and wax are bloomed on the rubber surface to form a protective layer developing an excellent age resistant effect. However, when the protective layer is exposed to ultraviolet rays, the amine series antioxidant is discolored brown to considerably degrade the tire appearance. Particularly, in order to prevent the above phenomenon in tires for passenger cars, various studies have been made from viewpoints of the improvement of antioxidant and the use of non-diene rubber, but there has not yet been found an effective prevention method.

Furthermore, the rubber composition for use in a tire tread has frequently been composed of a blend of natural rubber, BR and SBR. In case of large size tires, since the ground contact pressure per unit area at the tread surface is large and also the heat release value of rubber is large, the tire tread is generally constructed with a rubber composition composed mainly of natural rubber having a small heat evolution and a large breaking strength. On the other hand, in the tires for passenger cars, the pressure at the tread surface and the heat release value are small as compared with those of the large size tire, and also the heat build-up is less because of the thin tread gauge. Therefore, in order to provide high traction, particularly high friction coefficient at wet state, the rubber composition for the tread of the passenger car tire is composed mainly of SBR.

In the tire tread, the gripping property (particularly at wet state) and wear resistance are important properties, which have been improved by various methods up to date. However, weather resistance and resistance to crack growth, which were insignificant in the past, cause a problem with the improvement of wear resistance. This problem is a phenomenon of producing cracks in the groove bottom of the tread (i.e. groove crack). Such a phenomenon is observed in the tire, particularly after long use, when a greater part of the amine series antioxidant originally contained in the rubber composition has been consumed; this particularly becomes a serious problem at a high temperature area consuming a large amount of the antioxidant.

Many studies have been made in order to solve this problem. For instance, there have been attempted a method of increasing the amount of amine series antioxidant used, a method of using non-diene rubber composition in a tread, a method wherein a thin rubber sheet having good weather resistance is placed on the tread surface (because the surface portion of the tread is lost by wearing, while the groove portion thereof still remains at the last running stage) and so on. Among them, the increase of amine series antioxidant seems to be an immediately effective method. However, it is very effective for the weather resistance at initial running stage, but the effect of improving the weather resistance at last running stage is very small. This is due to the fact that since the amine series antioxidant improving the weather resistance is rapidly bloomed on the tread rubber surface to form the protective layer as previously mentioned, even when the amount of the antioxidant added is made large, the thickness of the protective layer is merely thickened and the holding time itself can not be prolonged.

As to the use of non-highly unsaturated rubber composition, the development is backward because the conventional non-diene rubber (e.g. butyl rubber, halogenated butyl rubber, conventional EPDM, chlorosulfonated polyethylene rubber or the like) is poor in wear resistance and is used with difficulty in a tread rubber composition requiring weather resistance as an important factor.

In the case of placing the thin rubber sheet on the tread surface, the use of non-diene rubber containing no double bond in its main chain is effective as the thin rubber sheet having a good weather resistance, but the adhesion to diene rubber (covulcanizability) is poor, so that there is a problem that even if the rubber sheet is apparently adhered to diene rubber during a static test, peeling is caused therebetween due to dynamic deformation suffered during the running of the tire. Consequently, the use of the thin rubber sheet is hardly practised.

SUMMARY OF THE INVENTION

It is an object of the invention to provide a rubber composition wherein both the resistance to crack growth and wear resistance are considerably improved as compared with those of the conventional EPDM rubber composition by controlling a microstructure of rubber composed mainly of ethylene, propylene and diene without greatly raising the iodine value.

It is another object of the invention to provide a pneumatic tire wherein the resistance to crack growth and weather resistance are considerably improved and the appearance is greatly improved by using the above rubber composition without substantially using an amine series antioxidant and a paraffinic wax.

According to a first aspect of the invention, there is the provision of a vulcanizable rubber composition comprising not less than 20 parts by weight of a rubber composed mainly of ethylene, propylene and diene and satisfying all of the following requirements:
(1) a glass transition temperature (Tg) of not higher than −50° C. as measured by a differential scanning calorimeter (DSC);
(2) an iodine value of 10~34;
(3) a weight-average molecular weight of not less than 220,000;
(4) an ethylene content of 68~85 mol %;
(5) a molecular weight distribution ($\overline{M}w/\overline{M}n$) of not less than 3.0;
(6) $95 \leq 1.5 \times$ (iodine value) + (ethylene content) $\leq 120$; and
(7) $90 \leq$ (weight-average molecular weight) $\times 10^{-4}$ + (ethylene content) $\leq 110$
, and 20~150 parts by weight of an inorganic filler based on 100 parts by weight of rubber content.

According to a second aspect of the invention, there is the provision of a pneumatic tire comprising a tread, sidewalls and bead portions; said sidewall being constructed by using a rubber composition comprising not less than 20 parts by weight of a rubber composed mainly of ethylene, propylene and diene, not less than 10 parts by weight of an isoprene rubber, not less than 10 parts by weight of a process oil and 20~100 parts by weight of an inorganic filler based on 100 parts by weight of rubber content.

According to a third aspect of the invention, there is the provision of a pneumatic tire comprising a tread, sidewalls and bead portions; said tread being constructed by using a rubber composition comprising not less than 20 parts by weight of a rubber composed mainly of ethylene, propylene and diene, not less than 10 parts by weight of a process oil and 50~150 parts by weight of an inorganic filler based on 100 parts by weight of rubber content.

DESCRIPTION OF THE PREFERRED EMBODIMENTS

According to the invention, the reason why the amount of rubber composed mainly of ethylene, propylene and diene is limited to not less than 20 parts by weight is due to the fact that when the amount is less than 20 parts by weight, sufficient weather resistance and thermal aging resistance can not be obtained. The rubber composed mainly of ethylene, propylene and diene (hereinafter abbreviated as E/P rubber) according to the invention has a characteristic that the weather resistance and thermal aging resistance are rapidly improved when the blending amount is increased to arrive at a range of 26~30 parts by weight through the reason on such an improvement is not clear, so that the blending amount of the E/P rubber is preferably not less than 30 parts by weight. On the other hand, the reason why the amount of the inorganic filler is limited to a range of 20~150 parts by weight is due to the fact that when the amount of the inorganic filler is less than 20 parts by weight, the breaking strength (strength at break, elongation at break) after the vulcanization of the rubber composition is insufficient, while when it exceeds 150 parts by weight, the processability at unvulcanized state is insufficient.

The reason why the glass transition temperature of the E/P rubber is restricted to not higher than −50° C. as measured at a temperature rising rate of 10° C./min by DSC is due to the fact that when the glass transition temperature is higher than −50° C., satisfactory resistance to crack growth and bending durability can not be obtained. Furthermore, the restriction of iodine value to a range of 10~34 is based on the following fact. That is, when the iodine value is less than 10, sufficient covulcanizability with diene rubber, resistance to crack growth, strength at break and elongation at break can not be obtained, while when it exceeds 34, the effect of largely improving the resistance to crack growth, strength at break and elongation at break can not be expected and also the wear resistance after the thermal aging lowers. Moreover, a third ingredient used for enhancing the iodine value is generally expensive in the cost, so that the amount of the third ingredient used is necessary to be reduced in the rubber composition used for the manufacture of rubber articles as far as possible, which is also true in the case of using the E/P rubber.

In the E/P rubber according to the invention, when the weight-average molecular weight is not less than 220,000, the effect of improving the resistance to crack growth and the wear resistance is conspicuous, and also the adhesion strength to diene rubber is largely improved. However, as the molecular weight increases, the viscosity rapidly rises and the processability at unvulcanized state considerably degrades. Therefore, when the weight-average molecular weight exceeds 240,000, it is preferable to subject the E/P rubber to an oil extension. In the latter case, however, when the weight-average molecular weight exceeds 300,000, the amount of oil required for the processability is too large and the properties after vulcanization such as wear resistance and the like largely degrade. As the oil to be used in oil extension, paraffinic oil is favorable.

In the E/P rubber according to the invention, when the ethylene content is within a range of 68~85 mol %, satisfactory resistance to crack growth, strength at break and elongation at break are first obtained. If the ethylene content is less than 68 mol %, even when the iodine value is not less than 10, the effect of improving the resistance to crack growth, strength at break and elongation at break is very small, while if it is higher than 85 mol %, the resulting E/P rubber substantially comes to polyethylene resin and is difficult to industrially use as a rubber because the elongation at break is small and the modulus of elasticity is high.

The reason why the molecular weight distribution ($\overline{Mw}/\overline{Mn}$) of the E/P rubber is limited to not less than 3.0 is due to the fact that when the molecular weight distribution ($\overline{Mw}/\overline{Mn}$) is less than 3.0, the roll processability is poor and the industrial use is difficult.

When the value of 1.5×(iodine value)+(ethylene content) is less than 95, satisfactory resistance to crack growth, strength at break and elongation at break are not obtained, while when it is more than 120, the thermal aging resistance (including the wear resistance after the thermal aging) lowers.

Further, when the value of (weight-average molecular weight)×$10^{-4}$+(ethylene content) is less than 90, the covulcanizability with diene rubber and resistance to crack growth are insufficient, while when it is more than 110, not only the processability (dispersibility of carbon black and roll processability) is poor, but also the modulus of elasticity of the rubber composition becomes too large and the industrial use is difficult.

The reasons on the restrictions of the requirements as mentioned above explain that the given properties of the E/P rubber are established within certain ranges defined in the above requirements. In other words, these reasons mean that the effect of the invention can not be obtained when the requirements (1)-(7) are not simultaneously satisfied, because there are some synergistic actions among these requirements which have never been known in the past.

The E/P rubber according to the invention may be produced by blending some rubbers composed mainly of ethylene and propylene. Such a blend certainly exhibits good properties and naturally belongs to the category of the invention. However, when using the E/P rubber obtained by polymerizing so as to simultaneously satisfy all of the requirements (1)-(7), the resulting rubber composition exhibits excellent properties (resistance to crack growth, wear resistance, strength at break, elongation at break and so on).

In the E/P rubber according to the invention, ethylidene norbornene (ENB) is preferably contained as a third ingredient in addition to ethylene and propylene. However, the conventionally used third ingredient such as dicyclopentadiene (DCP), 1,4-hexadiene or the like may be used as much as the satisfactory resistance to crack growth, strength at break and elongation at break can be expected.

According to the invention, it is desirable that the amount of extender oil contained in the E/P rubber is not less than 40 parts by weight. When the weight-average molecular weight of the E/P rubber is preferably not less than 250,000 for sufficiently developing the effect of the invention, if the amount of extender oil is less than 40 parts by weight, the processability is poor and the industrial use becomes difficult.

In the rubber composition according to the invention, it is preferable to contain not less than 10 parts by weight, particularly not less than 20 parts by weight of an isoprene rubber. When the amount of isoprene rubber is less than 10 parts by weight, the kneading operability degrades and it is difficult to obtain sufficient rubber properties after the vulcanization according to the compounding recipe. Further, the use of isoprene rubber is industrially favorable rather than the use of the obtain diene rubber from a viewpoint of securing the strength at break. The term "isoprene rubber" used herein means to include natural rubber and synthetic polyisoprene rubber.

As the inorganic filler used in the rubber composition according to the invention, carbon black is most preferable, but silicon dioxide (silica), calcium carbonate, titanium dioxide, zinc white and the like may be used.

When the rubber composition according to the invention is applied to the tire sidewall, carbon black is preferable to have an iodine absorption value of 35~100 mg/g and a DBP oil absorption of 70~140 ml/100 g. When the iodine absorption value is less than 35 mg/g, it is difficult to obtain the desired strength at break, while when it exceeds 100 mg/g, the bending durability lowers. On the other hand, when the DBP oil absorption is less than 70 ml/100 g, the dispersibility of carbon black is insufficient, while when it exceeds 140 ml/100 g, the hardness after the vulcanization becomes too high and the bending durability degrades.

Furthermore, when the rubber composition according to the invention is applied to the tire tread, carbon black is favorable to have an iodine absorption value of 85~200 mg/g and a DBP oil absorption of 100~180 ml/100 g. When the iodine absorption value is less than 85 mg/g and the DBP oil absorption is less than 100 ml/100 g, the wear resistance can not be ensured, while when the iodine absorption value is more than 200 mg/g and the DBP oil absorption is more than 180 ml/100 g, the dispersibility of carbon black can not be ensured.

Since the rubber composition according to the invention is considerably excellent in the weather resistance and thermal resistance as compared with the usually used diene rubber composition, it is not necessary to use an amine series antioxidant and a paraffinic wax. However, when the amount of the E/P rubber used according to the invention is as low as 20 parts by weight, not more than 0.3 part by weight of amine series antioxidant and/or not more than 0.5 part by weight of paraffinic wax may be added.

According to the invention, the hardness after the vulcanization of the rubber composition constituting the tire sidewall (JIS spring type hardness, type A) is preferable to be within a range of 30~60 in view of the bending durability and resistance to crack growth because the sidewall is subjected to a constant strain deformation. On the other hand, the hardness after the vulcanization of the rubber composition constituting the tire tread (JIS spring type hardness, type A) is preferable to be within a range of 55~70. When the hardness is less than 55, the cornering stability of the tire and the resistance to crack growth degrade, while when it exceeds 70, not only the resistance to rib tear and the bending durability but also the gripping property degrade, and it is difficult to ensure the sufficient braking performance.

The production of the E/P rubber used in the invention will be described below.

That is, the E/P rubber according to the invention is produced, for example, by adjusting ethylene, propylene and ethylidene norbornene as a third ingredient to a desirable composition and randomly copolymerizing them in a hydrocarbon solvent in the presence of a catalyst consisting of (a) a soluble vanadium compound represented by a general formula of $VO(OR)_nX_{3-n}$ (wherein R is a hydrocarbon residue, X is a halogen atom and $0 \leq n \leq 3$) or a vanadium compound represented by a general formula of $VX_4$ and (b) an organic aluminum compound represented by a general formula of $R'_mAlX'_{3-m}$ (wherein R' is a hydrocarbon residue, X' is a halogen atom and $0 \leq m \leq 3$).

As the vanadium compound represented by the above general formulae, mention may be made of $VO(OCH_3)Cl_2$, $VO(OCH_3)_2Cl$, $VO(OCH_3)_3$, $VO(OC_2H_5)Cl_2$, $VO(OC_2H_5)_2Cl$, $VO(OC_2H_5)_3$, $VO(OC_2H_5)_{1.5}Br_{1.5}$, $VO(OC_3H_7)Cl_2$, $VO(OC_3H_7)_{1.5}Cl_{1.5}$, $VO(OC_3H_7)_2Cl$, $VO(OC_3H_7)_3$, $VO(O\text{-}n\text{-}C_4H_9)Cl_2$, $VO(O\text{-}n\text{-}C_4H_9)_2Cl$, $VO(O\text{-}iso\text{-}C_4H_9)Cl_2$, $VO(O\text{-}sec\text{-}C_4H_9)_3$, $VO(OC_5H_{11})_{1.5}Cl_{1.5}$, $VOCl_3$, $VCl_4$ and mixtures thereof. Among them, $VO(OC_2H_5)Cl_2$ and $VOCl_3$ are particularly preferable.

As the organic aluminum compound, mention may be made of $(CH_3)_2AlCl$, $(CH_3)_{1.5}AlCl_{1.5}$, $(CH_3)AlCl_2$, $(C_2H_5)_2AlCl$, $(C_2H_5)_{1.5}AlCl_{1.5}$, $(C_2H_5)AlCl_2$, $(C_3H_7)_2AlCl$, $(C_3H_7)_{1.5}AlCl_{1.5}$, $(C_3H_7)AlCl_2$, $(C_6H_{13})_{1.5}AlCl_{1.5}$, $(C_6H_{13})Al_2Cl$, $(C_6H_{13})AlCl_2$ and mixture thereof.

In the above catalyst, the ratio of organic aluminum compound to vanadium compound is within a range of 2~50, preferably 5~30 as an atomic ratio of Al/V.

The copolymerization may be carried out in a hydrocarbon solvent. As the hydrocarbon solvent, use may be made of aliphatic hydrocarbons such as hexane, heptane, octane, kerosine and the like; aromatic hydrocarbons such as benzene, toluene, xylene and the like; and mixtures thereof.

In the copolymerization reaction medium, the amount of the vanadium compound is 0.01~5 millimol/l, preferably 0.1~2 millimol/l.

The ethylene content of the E/P rubber may be varied by controlling the feeding amount of ethylene in the copolymerization However, it is industrially difficult to obtain the ethylene content of more than 85 mol %. (In laboratory, the ethylene content it is industrially difficult to obtain the ethylene content of more than 85 mol %. (In laboratory, the ethylene content it is industrially difficult to obtain the ethylene content of more than 85 mol %. (In laboratory, the ethylene content it is industrially difficult to obtain the ethylene content of more than 85 mol %. (In laboratory, the ethylene content it is industrially difficult to obtain the ethylene content of more than 85 mol %. (In laboratory, the ethylene content it is industrially difficult to obtain the ethylene content of more than 85 mol %. (In laboratory, the ethylene content of more than 85 mol % can be achieved with the reduction of the yield.)

The polymerization temperature is 0°~100° C., preferably 20°~80° C., and the polymerization pressure is 0~50 kg/cm². Moreover, the adjustment of molecular weight is performed by using hydrogen.

The following examples are given in illustration of the invention and are not intended as limitations thereof.

PRODUCTION EXAMPLE

The rubber composed mainly of ethylene, propylene and diene (E/P rubber) according to the invention was produced as follows.

The copolymerization of ethylene, propylene and ethylidene norbornene was continuously carried out in a stainless polymerization vessel of 15 l capacity provided with a stirring device.

Hexane as a solvent was continuously charged at a rate of 5 l/hr into the upper portion of the polymerization vessel. On the other hand, the polymerized solution was taken out from the lower portion of the polymerization vessel so as to always maintain 5 l of the solution in the vessel. The catalyst composed of (a) $VO(OC_2H_5)Cl_2$ and (b) $(C_2H_5)_{1.5}AlCl_{1.5}$ was continuously charged into the upper portion of the vessel so as to maintain vanadium atomic concentration of 0.28 millimol/l and aluminum atomic concentration of 1.85 millimol/l in the vessel. Further, a mixed gas of ethylene and propylene (ethylene: 45 mol %, propylene: 55 mol %) was charged into the upper portion of the vessel at a rate of 450 l/hr, while ethylidene norbornene was charged at a rate of 25 g/hr. Moreover, a hydrogen gas was charged at a rate of 3.2 l/hr as a molecular weight adjusting agent.

The polymerization temperature was controlled to 41° C. through a jacket attached to the outer surface of the polymerization vessel. The pressure inside the vessel was 4.8 kg/cm².

The polymerized solution taken out from the lower portion of the vessel was subjected to a steam stripping, dried at 80° C. over a night and then dried under vacuum. Thus, rubber composed mainly of ethylene, propylene and diene (E/P rubber) was continuously obtained at a rate of 265 g/hr as Sample-1.

Then, the weight-average molecular weight ($\overline{Mw}$) and molecular weight distribution ($\overline{Mw}/\overline{Mn}$) were measured by a gel permeation chromatography (GPC method), wherein the weight-average molecular weight was determined by converting into polystyrene.

Further, E/P rubbers as Sample-2 to Sample-11 were produced by properly varying the amount of ethylene, amount of third ingredient, ratio of Al/V in the catalyst, polymerization temperature, polymerization time and the like.

The details of the thus obtained E/P rubbers are shown in the following Tables 1 and 2.

TABLE 1

|  | Tg (°C.) | Iodine value | $\overline{Mw}$ ($\times 10^4$) | Ethylene content (mol %) | $\overline{Mw}/\overline{Mn}$ | Amount of extender oil* (part by weight) | Third ingredient |
| --- | --- | --- | --- | --- | --- | --- | --- |
| EP33 | −55 | 22 | 17 | 65 | 3.5 | 0 | ENB |
| EP43 | −55 | 6 | 18 | 65 | 3.5 | 0 | ENB |
| Sample-1 | −60 | 15 | 25 | 77 | 4.0 | 30 | ENB |
| Sample-2 | −60 | 8 | 26 | 78 | 4.5 | 40 | ENB |

TABLE 1-continued

|  | Tg (°C.) | Iodine value | $\bar{M}w$ ($\times 10^4$) | Ethylene content (mol %) | $\bar{M}w/\bar{M}n$ | Amount of extender oil* (part by weight) | Third ingredient |
| --- | --- | --- | --- | --- | --- | --- | --- |
| Sample-3 | −46 | 25 | 22 | 50 | 3.5 | 0 | ENB |
| Sample-4 | −58 | 30 | 23 | 71 | 3.8 | 30 | ENB |
| Sample-5 | −69 | 37 | 18 | 72 | 2.2 | 0 | ENB |
| Sample-6 | −60 | 18 | 26 | 65 | 5.5 | 40 | ENB |
| Sample-7 | −59 | 18 | 24 | 75 | 2.3 | 30 | ENB |
| Sample-8 | −60 | 15 | 33 | 78 | 3.5 | 50 | ENB |
| Sample-9 | −60 | 18 | 26 | 83 | 3.5 | 40 | ENB |
| Sample-10 | −60 | 18 | 26 | 87 | 3.5 | 40 | ENB |
| Sample-11 | −60 | 15 | 26 | 78 | 3.5 | 40 | DCP |

*The amount of extender oil is represented as part by weight per 100 parts of rubber composed of ethylene, propylene and diene.

TABLE 2

|  | $1.5 \times$ (Iodine value) + (Ethylene content) | (Weight-average molecular weight) $\times 10^{-4}$ + (Ethylene content) |
| --- | --- | --- |
| EP33 | 98 | 82 |
| EP43 | 74 | 83 |
| Sample-1 | 99.5 | 102 |
| Sample-2 | 90 | 104 |
| Sample-3 | 87.5 | 72 |
| Sample-4 | 116 | 104 |
| Sample-5 | 127.5 | 90 |
| Sample-6 | 92 | 91 |
| Sample-7 | 102 | 99 |
| Sample-8 | 100.5 | 111 |
| Sample-9 | 110 | 109 |
| Sample-10 | 114 | 113 |
| Sample-11 | 100.5 | 104 |

In Tables 1 and 2, EP33 and EP43 are EPDM made by Japan Synthetic Rubber Co., Ltd., respectively, and the extender oil is a paraffinic oil (non-staining) made by Idemitsu Sekiyu Kagaku K.K.

EXAMPLES 1~2

Each of five rubber compositions having a compounding recipe as shown in the following Table 3 was prepared in a Banbury mixer and vulcanized at 145° C. for 30 minutes. The properties of the resulting vulcanized rubber were evaluated by the following test method.

(1) Resistance to crack growth

After a test piece of 60 mm×100 mm×1.0 mm was provided at its center with a scratch of 0.3 mm in length, it was subjected to an extension fatigue cracking test at an oscillation number of 300 cycle/min under a strain of 50%, during which a time till growth up to 20 mm was measured. The resistance to crack growth was determined according to the following equation and evaluated by an index value on the basis that the value of control (Comparative Example 1) was 100.

$$\text{Resistance to crack growth(index)} = \frac{\text{Time of control}}{\text{Time of test piece}} \times 100$$

The larger the numerical value, the better the resistance to crack growth.

(2) Wear resistance after thermal aging

An original specimen and a specimen obtained by leaving the original specimen in a thermostatic chamber of 120° C. for 24 hours were subjected to an Akron type abrading test (load: 6 lbs, angle: 15°, abrading number: 1,000 times), respectively, from which a ratio of abrasion loss was calculated according to the following equation:

$$\text{Ratio of abrasion loss} = \frac{\text{Abrasion loss of original specimen}}{\text{Abrasion loss of specimen after thermalaging}}$$

Then, wear resistance was evaluated by the following equation:

$$\text{Wear resistance(index)} = \frac{\text{Abrasion loss ratio of test piece}}{\text{Abrasion loss ratio of control}} \times 100$$

(3) Thermal aging resistance

An original specimen of 150 mm×150 mm×2.0 mm and a specimen obtained by leaving the original specimen in a thermostatic chamber of 120° C. for 24 hours were subjected to a test for the measurement of strength at break, respectively, from which a ratio of strength at break was calculated according to the following equation:

$$\text{Ratio of strength at break} = \frac{\text{Strength at break of specimen after thermalaging}}{\text{Strength at break of original specimen}}$$

Then, the thermal aging resistance was evaluated by the following equation:

$$\text{Thermalaging resistance(index)} = \frac{\text{Ratio of strength at break of test piece}}{\text{Ratio of strength at break of control}} \times 100$$

(4) Strength and elongation at break

They were measured according to JIS K6301. Moreover, the test piece had a shape of JIS No. 3.

(5) Weather resistance

A test piece of 20 mm×100 mm×1.0 mm was elongated to 50% and left to stand in a thermostatic chamber at 40° C. and an ozone concentration of 50 ppm, during which a time till cracks were visually observed was measured. Then, the weather resistance was evaluated according to the following equation:

$$\text{Weather resistance(index)} = \frac{\text{Time of test piece}}{\text{Time of control}} \times 100$$

The larger the numerical value, the better the weather resistance.

The measured results are shown in Table 3. As seen from Table 3, the rubber compositions of Examples 1 and 2 according to the invention are considerably excellent in the resistance to crack growth, thermal aging resistance, strength at break and elongation at break as compared with the rubber compositions using the conventional rubber composed mainly of ethylene and propylene.

TABLE 3

|  | Comparative Example 1 | Comparative Example 2 | Comparative Example 3 | Example 1 | Example 2 |
|---|---|---|---|---|---|
| Natural rubber | 50 | 50 | 50 | 50 | 50 |
| BR01 | 50 | — | — | — | — |
| EP43 | — | 50 | — | — | — |
| EP33 | — | — | 50 | — | — |
| Sample-1 | — | — | — | 65 | — | pared in a Banbury mixer and then vulcanized at 145° C. for 30 minutes. The properties of the resulting vulcanized rubber were measured in the same manner as described in Example 1, and the roll processability was visually evaluated. The measured results are also shown in Table 4. Moreover, the paraffinic oil was the same as used as an extender oil in Production Example. In Comparative Example 11, the resistance to crack growth, strength at break and elongation at break lowered because the modulus of elasticity of the rubber composition was high. It it apparent from Table 4 that the effect of the invention can not be achieved unless the E/P rubber simultaneously satisfies all of the requirements (1)~(7).

TABLE 4

|  | Comparative Example 4 | Comparative Example 5 | Comparative Example 6 | Example 3 | Comparative Example 7 | Comparative Example 8 | Comparative Example 9 | Comparative Example 10 | Example 4 | Comparative Example 11 |
|---|---|---|---|---|---|---|---|---|---|---|
| Natural rubber | 30 | 30 | 30 | 30 | 30 | 30 | 30 | 30 | 30 | 30 |
| SBR 1500 | 30 | 30 | 30 | 30 | 30 | 30 | 30 | 30 | 30 | 30 |
| BR01 | 40 | — | — | — | — | — | — | — | — | — |
| Sample-2 | — | 56 | — | — | — | — | — | — | — | — |
| Sample-3 | — | — | 40 | — | — | — | — | — | — | — |
| Sample-4 | — | — | — | 52 | — | — | — | — | — | — |
| Sample-5 | — | — | — | — | 40 | — | — | — | — | — |
| Sample-6 | — | — | — | — | — | 56 | — | — | — | — |
| Sample-7 | — | — | — | — | — | — | 52 | — | — | — |
| Sample-8 | — | — | — | — | — | — | — | 60 | — | — |
| Sample-9 | — | — | — | — | — | — | — | — | 56 | — |
| Sample-10 | — | — | — | — | — | — | — | — | — | 56 |
| Carbon black ISAF | 45 | 45 | 45 | 45 | 45 | 45 | 45 | 45 | 45 | 45 |
| Paraffinic oil | 16 | — | 16 | 4 | 16 | — | 4 | — | — | — |
| Stearic acid | 2 | 2 | 2 | 2 | 2 | 2 | 2 | 2 | 2 | 2 |
| Santoflex 13 | 1 | — | — | — | — | — | — | 1 | — | — |
| ZnO | 3 | 3 | 3 | 3 | 3 | 3 | 3 | 3 | 3 | 3 |
| CZ | 0.6 | 0.8 | 0.8 | 0.8 | 0.8 | 0.8 | 0.8 | 0.6 | 0.8 | 0.8 |
| TS | 0.2 | 0.2 | 0.2 | 0.2 | 0.2 | 0.2 | 0.2 | 0.2 | 0.2 | 0.2 |
| Sulfur | 1.5 | 1.5 | 1.5 | 1.5 | 1.5 | 1.5 | 1.5 | 1.5 | 1.5 | 1.5 |
| Weather resistance | 100 | * | * | * | * | * | * | * | * | 98 |
| Thermal aging resistance | 100 | 139 | 131 | 135 | 129 | 138 | 132 | 135 | 112 | 96 |
| Resistance to crack growth | 100 | 48 | 24 | 215 | 158 | 96 | 186 | 169 | 105 | 64 |
| Strength at break | 100 | 68 | 60 | 102 | 99 | 89 | 93 | 95 | 100 | 75 |
| Elongation at break | 100 | 65 | 72 | 100 | 98 | 88 | 100 | 92 | 98 | 69 |
| Wear resistance after thermal aging | 100 | 126 | 122 | 115 | 86 | 116 | 114 | 126 | 128 | 126 |
| Roll processability | good | good | good | good | good | good | bad baggy | bad baggy | good | good |

*No crack occurred even after 168 hours.

|  |  |  |  |  |  |
|---|---|---|---|---|---|
| Sample-11 | — | — | — | — | 70 |
| Carbon black HAF | 55 | 55 | 55 | 55 | 55 |
| Aromatic oil *1 | 20 | 20 | 20 | 5 | — |
| Stearic acid | 2 | 2 | 2 | 2 | 2 |
| Santoflex 13 *2 | 1 | — | — | — | — |
| ZnO | 3 | 3 | 3 | 3 | 3 |
| CZ *3 | 0.5 | 0.8 | 0.8 | 0.8 | 0.8 |
| TS *4 | 0.2 | 0.2 | 0.2 | 0.2 | 0.2 |
| Sulfur | 1.5 | 1.5 | 1.5 | 1.5 | 1.5 |
| Weather resistance | 100 | * | * | * | * |
| Thermal aging resistance | 100 | 130 | 125 | 136 | 139 |
| Resistance to crack growth | 100 | 21 | 32 | 228 | 176 |
| Strength at break | 100 | 65 | 34 | 100 | 98 |
| Elongation at break | 100 | 76 | 62 | 101 | 100 |

Note: *No crack occurred even after 168 hours
*1 made by Fuji Kosan K.K.
*2 antioxidant, N—(1,3-dimethyl-butyl)N'—phneyl-p-phenylenediamine
*3 vulcanization accelerator, N—cyclohexyl-2-benzothiazylsulfenamide
*4 vulcanization accelerator, tetramethyl thiurammonosulfide

EXAMPLES 3~4

Each of ten rubber compositions having a compounding recipe as shown in the following Table 4 was pre-

EXAMPLES 5~7

Each of five rubber compositions having a compounding recipe as shown in the following Table 5 was prepared by using the E/P rubber of Sample-1 in a Banbury mixer and then vulcanized at 145° C. for 30 minutes. The properties of the vulcanized rubber were measured in the same manner as described in Example 1 to obtain results as shown in Table 5. In Table 5, the amount of the E/P rubber based on 100 parts by weight of rubber content in Comparative Example 13 and Examples 5~7 except the amount of extender oil (30 parts by weight) were 15, 25, 40 and 80 parts by weight, respectively. As seen from the results of Table 5, the effect of the invention is first developed by using not less than 20 parts by weight of the E/P rubber according to the invention.

TABLE 5

|  | Comparative Example 12 | Comparative Example 13 | Example 5 | Example 6 | Example 7 |
|---|---|---|---|---|---|
| Natural rubber | 100 | 85 | 75 | 60 | 20 |
| Sample-1 | — | 19.5 | 32.5 | 52 | 104 |
| Carbon black HAF | 50 | 50 | 50 | 50 | 50 |
| Paraffinic oil | 16 | 10 | 8.5 | 4 | — |
| Stearic acid | 2 | 2 | 2 | 2 | 2 |
| Santoflex 13 | 1 | — | — | — | — |
| ZnO | 3 | 3 | 3 | 3 | 3 |
| CZ | 0.6 | 0.8 | 0.8 | 0.8 | 0.8 |
| TS | 0.2 | 0.2 | 0.2 | 0.2 | 0.2 |
| Sulfur | 1.5 | 1.5 | 1.5 | 1.5 | 1.5 |
| Weather resistance | 100 | 115 | 314 | * | * |
| Thermal aging resistance | 100 | 106 | 117 | 127 | 137 |
| Resistance to crack growth | 100 | 99 | 186 | 265 | 201 |
| Wear resistance after thermal aging | 100 | 97 | 104 | 108 | 108 |
| Strength at break | 100 | 97 | 101 | 100 | 101 |
| Elongation at break | 100 | 97 | 100 | 105 | 101 |

*No crack occurred even after 168 hours

A radial tire for passenger car having a tire size of 165 SR 13 was manufactured by applying each of the above five rubber compositions to each of five parts equally divided on the circumference of the tire tread, which was run on an outdoor drum tester at a speed of 65 km/hr under an internal pressure of 1.7 kg/cm² and a JIS 150% load over a distance of 150,000 km. Thereafter, the occurrence of cracks produced in the groove bottom of the tread was observed to evaluate the weather resistance. As a result, cracks frequently occurred in the groove bottoms of the tread portions made from the rubber compositions of Comparative Examples 12 and 13, while no occurrence of cracks was observed in Examples 5~7.

EXAMPLES 8~10

Each of five rubber compositions having a compounding recipe as shown in the following Table 6 was prepared in the same manner as described in Example 5, and then the dispersibility of carbon black, weather resistance and strength at break were measured to obtain results as shown in Table 6. As seen from Table 6, when the amount of the inorganic filler, i.e. carbon black is less than 20 parts by weight or more than 150 parts by weight, the rubber composition is not durable in use. Particularly, the properties in Comparative Example 15 were not performed because the dispersibility of carbon black was bad.

TABLE 6

|  | Comparative Example 14 | Example 8 | Example 9 | Example 10 | Comparative Example 15 |
|---|---|---|---|---|---|
| Natural rubber | 60 | 60 | 60 | 60 | 60 |
| Sample-1 | 52 | 52 | 52 | 52 | 52 |
| Carbon black HAF | 18 | 25 | 100 | 140 | 160 |
| Paraffinic oil | — | — | 20 | 50 | 60 |
| Stearic acid | 2 | 2 | 2 | 2 | 2 |
| Santoflex 13 | 1 | — | — | — | — |
| ZnO | 3 | 3 | 3 | 3 | 3 |
| CZ | 0.6 | 0.8 | 0.8 | 0.8 | 0.8 |
| TS | 0.2 | 0.2 | 0.2 | 0.2 | 0.2 |
| Sulfur | 1.5 | 1.5 | 1.5 | 1.5 | 1.5 |
| Dispersibility of carbon black | good | good | good | acceptable | bad |
| Weather resistance | * | * | * | * | — |
| Strength at break | 65 | 100 | 174 | 120 | — |

EXAMPLES 11~12

A radial tire for passenger car having a tire size of 195/70 HR14 was manufactured by applying each of five rubber compositions having a compounding recipe as shown in the following Table 7 to each of five parts equally divided on the circumference of the tire sidewall, and then the tire properties were evaluated as follows.

(1) Resistance to crack growth

After 20 scratches of 2 mm in width and 1.5 mm in depth were alternately formed on each divided part of the tire sidewall at angles of +45° and −45° with respect to the radial direction, the tire subjected to an internal pressure of 1.7 kg/cm² was run on an indoor drum tester at a speed of 65 km/hr under a JIS 100% load to measure a time till the scratch grew up to a length of 2.0 cm. The resistance to crack growth was evaluated by the following equation:

$$\text{Resistance to crack growth(index)} = \frac{\text{Time of test piece}}{\text{Time of control}} \times 100$$

The larger the numerical value, the better the resistance to crack growth.

(2) Weather resistance

After the tire was actually run over a distance of 40,000 km, the weather resistance was evaluated by the presence or absence of cracks.

(3) Discoloration in sidewall

The degree of discoloration in the sidewall of the tire used in the evaluation of weather resistance before and after the running was measured by means of a color difference meter of CR 100 type made by Minolta Camera Co., Ltd., from which a rise of lightness ($\Delta L$) was calculated. The larger the value, the larger the discoloration degree.

(4) Thermal aging resistance

The strength at break was measured with respect to an original specimen obtained by vulcanizing the rubber composition of Table 7 at 145° C. for 30 minutes and a specimen obtained by leaving the original specimen in a thermostatic chamber of 120° C. for 24 hours, from which a ratio of strength at break was calculated. Then, the thermal aging resistance was evaluated according to the following equation:

$$\text{Thermalaging resistance(index)} = \frac{\text{Ratio of strength at break of test piece}}{\text{Ratio of strength at break of control}} \times 100$$

The reason why Santoflex 13 and paraffin wax were used as an antioxidant in Comparative Example 16 is due to the fact that the vulcanized rubber obtained by using a rubber composition of Comparative Example 16 except Santoflex 16 and paraffin wax was extremely poor in the weather resistance after the evaluation in laboratory under conditions of ozone concentration of 50 pphm, 40° C. and an elongation strain of 20%. As seen from Table 7, the rubber compositions containing the E/P rubber according to the invention are preferential in the weather resistance and thermal aging resistance and considerably excellent in the resistance to crack growth as compared with the conventional EPDM rubber composition.

TABLE 7

|  | Comparative Example 16 | Comparative Example 17 | Comparative Example 18 | Example 11 | Example 12 |
|---|---|---|---|---|---|
| Natural rubber | 50 | 50 | 50 | 50 | 50 |
| BR01 | 50 | — | — | — | — |
| EP43 | — | 50 | — | — | — |
| EP33 | — | — | 50 | — | — |
| Sample-1 | — | — | — | 65 | — |
| Sample-11 | — | — | — | — | 70 |
| Carbon black Li-HAF | 40 | 40 | 40 | 40 | 40 |
| Aromatic oil | 20 | 20 | 20 | 5 | — |
| Stearic acid | 2 | 2 | 2 | 2 | 2 |
| Santoflex 13 | 3 | — | — | — | — |
| Paraffin wax | 1 | — | — | — | — |
| ZnO | 3 | 3 | 3 | 3 | 3 |
| CZ | 0.5 | 0.8 | 0.8 | 0.8 | 0.8 |
| TS | 0.2 | 0.2 | 0.2 | 0.2 | 0.2 |
| Sulfur | 1.5 | 1.5 | 1.5 | 1.5 | 1.5 |
| Weather resistance | frequently occurred | * | none | none | none |
| Thermal aging resistance | 100 | 129 | 123 | 137 | 136 |
| Resistance to crack growth | 100 | 22 | 30 | 215 | 165 |
| Discoloration | 7.8 | 1.5 | 1.5 | 1.0 | 1.0 |

*No small crack occurred, but two large cracks (length: 1.8–2.5 cm) occurred.

EXAMPLES 13~14

A radial tire for truck and bus having a tire size of 1000 R 20 was manufactured by applying each of ten rubber compositions having a compounding recipe as shown in the following Table 8 to each of ten parts equally divided on the circumference of the tire sidewall, and then the tire performances were evaluated in the same manner as described in Example 11 to obtain results as shown in Table 8. In this case, the internal pressure of the tire was 7.5 kg/cm$^2$. Moreover, the strength at break, elongation at break and roll processability were evaluated in the same manner as described in Examples 1 and 3.

From the results of Table 8, it is understood that when the E/P rubber simultaneously satisfies all of the requirements defined in the invention, it exhibits satisfactory weather resistance, resistance to crack growth, thermal aging resistance, strength at break and elongation at break and good roll processability as a rubber composition for tire sidewall so that it can industrially be used in the manufacture of tires.

TABLE 8

|  | Comparative Example 19 | Comparative Example 20 | Comparative Example 21 | Example 13 | Comparative Example 22 | Comparative Example 23 | Comparative Example 24 | Comparative Example 25 | Example 14 | Comparative Example 26 |
|---|---|---|---|---|---|---|---|---|---|---|
| Natural rubber | 30 | 30 | 30 | 30 | 30 | 30 | 30 | 30 | 30 | 30 |
| SBR 1500 | 30 | 30 | 30 | 30 | 30 | 30 | 30 | 30 | 30 | 30 |
| BR01 | 40 | — | — | — | — | — | — | — | — | — |
| Sample-2 | — | 56 | — | — | — | — | — | — | — | — |
| Sample-3 | — | — | 40 | — | — | — | — | — | — | — |
| Sample-4 | — | — | — | 52 | — | — | — | — | — | — |
| Sample-5 | — | — | — | — | 40 | — | — | — | — | — |
| Sample-6 | — | — | — | — | — | 56 | — | — | — | — |
| Sample-7 | — | — | — | — | — | — | 52 | — | — | — |
| Sample-8 | — | — | — | — | — | — | — | 60 | — | — |
| Sample-9 | — | — | — | — | — | — | — | — | 56 | — |
| Sample-10 | — | — | — | — | — | — | — | — | — | 56 |
| Carbon black ISAF | 45 | 45 | 45 | 45 | 45 | 45 | 45 | 45 | 45 | 45 |
| Paraffinic oil | 16 | — | 16 | 4 | 16 | — | 4 | — | — | — |
| Stearic acid | 2 | 2 | 2 | 2 | 2 | 2 | 2 | 2 | 2 | 2 |
| Santoflex 13 | 3 | — | — | — | — | — | — | 1 | — | — |
| Paraffin wax | 1 | — | — | — | — | — | — | — | — | — |
| ZnO | 3 | 3 | 3 | 3 | 3 | 3 | 3 | 3 | 3 | 3 |
| CZ | 0.6 | 0.8 | 0.8 | 0.8 | 0.8 | 0.8 | 0.8 | 0.6 | 0.8 | 0.8 |
| TS | 0.2 | 0.2 | 0.2 | 0.2 | 0.2 | 0.2 | 0.2 | 0.2 | 0.2 | 0.2 |
| Sulfur | 1.5 | 1.5 | 1.5 | 1.5 | 1.5 | 1.5 | 1.5 | 1.5 | 1.5 | 1.5 |
| Weather resistance | frequently occurred | none | none | none | none | none | none | none | none | slight |
| Thermal aging resistance | 100 | 137 | 130 | 136 | 128 | 136 | 134 | 135 | 114 | 97 |
| Resistance to crack growth | 100 | 47 | 22 | 217 | 155 | 95 | 184 | 166 | 104 | 65 |
| Strength at break | 100 | 67 | 61 | 101 | 97 | 88 | 92 | 94 | 101 | 77 |
| Elongation at break | 100 | 68 | 71 | 101 | 99 | 87 | 100 | 127 | 128 | 124 |
| Roll processability | good | good | good | good | good | good baggy | bad baggy | bad | good | good |

EXAMPLES 15~17

Each of five rubber compositions having a compounding recipe as shown in the following Table 9 was prepared, which was applied to each of five parts equally divided on a circumference of a sidewall in a radial tire for passenger car having a tire size of 165 SR 13. The properties of the tire were evaluated in the same manner as described in the previous examples to obtain results as shown in Table 9. From the results of Table 9, it is understood that the effect of the invention is considerably enhanced when the E/P rubber according to the invention is used in an amount of not less than 20 parts by weight.

TABLE 9

|  | Comparative Example 27 | Comparative Example 28 | Example 15 | Example 16 | Example 17 |
|---|---|---|---|---|---|
| Natural rubber | 100 | 85 | 75 | 60 | 20 |
| Sample-1 | — | 19.5 | 32.5 | 52 | 104 |
| Carbon black FEF | 45 | 45 | 45 | 45 | 45 |
| Paraffinic oil | 16 | 10 | 8.5 | 4 | — |
| Stearic acid | 2 | 2 | 2 | 2 | 2 |
| Santoflex 13 | 3 | — | — | — | — |
| Paraffin wax | 1 | — | — | — | — |
| ZnO | 3 | 3 | 3 | 3 | 3 |
| CZ | 0.6 | 0.8 | 0.8 | 0.8 | 0.8 |
| TS | 0.2 | 0.2 | 0.2 | 0.2 | 0.2 |
| Sulfur | 1.5 | 1.5 | 1.5 | 1.5 | 1.5 |
| Weather resistance | frequently occurred | frequently occurred | none | none | none |
| Thermal aging resistance | 100 | 106 | 117 | 127 | 137 |
| Resistance to crack growth | 100 | 99 | 186 | 265 | 201 |
| Wear resistance after thermal aging | 100 | 97 | 104 | 108 | 108 |
| Strength at break | 100 | 97 | 101 | 100 | 101 |

EXAMPLES 18~20

Each of four rubber compositions having a compounding recipe as shown in the following Table 10 was prepared and vulcanized in the same manner as described in Example 1, and thereafter the dispersibility of carbon black, weather resistance and strength at break were measured in the same manner as described in Example 1. Then, the above four rubber compositions were applied to four parts equally divided on a circumference of a sidewall in a radial tire for passenger car having a tire size of 165 SR 13, and then the resistance to crack growth of the sidewall was measured in the same manner as described in Example 11. The measured results are also shown in Table 10.

TABLE 10

|  | Comparative Example 29 | Example 18 | Example 19 | Example 20 |
|---|---|---|---|---|
| Natural rubber | 60 | 60 | 60 | 60 |
| Sample-1 | 52 | 52 | 52 | 52 |
| Carbon black GPF | 18 | 25 | 90 | 110 |
| Paraffinic oil | — | — | 20 | 50 |
| Stearic acid | 2 | 2 | 2 | 2 |
| Santoflex 13 | 3 | — | — | — |
| Paraffin wax | 1 | — | — | — |
| ZnO | 3 | 3 | 3 | 3 |
| CZ | 0.6 | 0.8 | 0.8 | 0.8 |
| TS | 0.2 | 0.2 | 0.2 | 0.2 |
| Sulfur | 1.5 | 1.5 | 1.5 | 1.5 |
| Dispersibility of carbon black | good | good | good | acceptable |
| Weather resistance | frequently occurred | none | none | none |
| Strength at break | 65 | 100 | 168 | 115 |
| Resistance to crack growth | 121 | 100 | 115 | 82 |

As seen from Table 10, the rubber composition of Example 20 is somewhat low in the resistance to crack growth and is not so suitable as a rubber composition for the sidewall subjected to a constant strain deformation. On the other hand, the rubber composition of Comparative Example 28, wherein the amount of inorganic filler was less than 20 parts by weight, is low in the strength at break and poor in the weather resistance, so that it can not be used as a rubber composition for tire sidewall.

EXAMPLES 21~24

Each of four rubber compositions having a compounding recipe as shown in the following Table 11 was prepared and vulcanized in the same manner as described in Example 1. The properties of the vulcanized rubber were evaluated in the same manner as described in Example 1 to obtain results as shown in Table 11.

TABLE 11

|  | Example 21 | Example 22 | Example 23 | Example 24 |
|---|---|---|---|---|
| Natural rubber | 60 | 60 | 60 | 60 |
| Sample-1 | 52 | 52 | 52 | 52 |
| Carbon black HAF | 45 | — | — | — |
| Carbon black FEF | — | 45 | — | — |
| Carbon black GPF | — | — | 45 | — |
| Carbon black N683 | — | — | — | 45 |
| Aromatic oil | 15 | 15 | 15 | 15 |
| Stearic acid | 2 | 2 | 2 | 2 |
| ZnO | 3 | 3 | 3 | 3 |
| DOTG *1 | 0.5 | 0.5 | 0.5 | 0.5 |
| DM *2 | 0.6 | 0.6 | 0.6 | 0.6 |
| Sulfur | 1.5 | 1.5 | 1.5 | 1.5 |
| Resistance to crack growth | 114 | 100 | 100 | 82 |
| Weather resistance | none | none | none | none |
| Roll processability | good | good | good | good |
| Dispersibility of carbon black | good | good | good | good |

Note *1 vulcanization accelerator, di-o-tolylguanidine
*2 vulcanization accelerator, dibenzothiazyldisulfide For the reference, the iodine absorption value and DBP oil absorption of each of various carbon blacks are shown in the following Table 12.

TABLE 12

| Carbon black | Iodine absorption value (mg/g) | DBP oil absorption (ml/100 g) |
|---|---|---|
| SAF | 145 | 113 |
| LS-ISAF | 118 | 78 |
| HS-ISAF | 123 | 126 |
| ISAF | 121 | 114 |
| N-231 | 125 | 91 |
| HS-HAF | 90 | 124 |
| Li-HAF | 68 | 104 |
| HAF | 82 | 102 |
| FEF | 43 | 121 |
| GPF | 36 | 91 |
| N683 | 30 | 132 |
| N358 | 84 | 150 |

EXAMPLES 25~27

A radial tire for passenger car having a tire size of 175 SR 14 was manufactured by applying each of three rubber compositions having a compounding recipe as shown in the following Table 13 to each of three parts equally divided on the circumference of the tire sidewall.

The resistance to crack growth was measured with respect to the resulting tire in the same manner as described in Example 11. Moreover, the measurement of hardness was performed according to spring type hardness test (type A) of JIS K-6301. The measured results as shown in Table 13.

TABLE 13

|  | Example 25 | Example 26 | Example 27 |
|---|---|---|---|
| Natural rubber | 20 | 20 | 20 |
| Sample-1 | 104 | 104 | 104 |
| Carbon black HAF | 40 | 50 | 60 |
| Aromatic oil | 15 | 15 | 15 |
| Stearic acid | 2 | 2 | 2 |
| ZnO | 3 | 3 | 3 |
| DOTG | 0.5 | 0.5 | 0.5 |
| DM | 0.6 | 0.6 | 0.6 |
| Sulfur | 1.5 | 2.0 | 2.0 |
| Hardness | 57 | 62 | 67 |
| Resistance to crack growth | 100 | 58 | 39 |

As seen from Table 13, when the hardness of the sidewall rubber using the E/P rubber according to the invention exceeds 60, the resistance to crack growth rapidly lowers, so that the hardness of the sidewall rubber is preferable to be not more than 60. On the other hand, when the hardness is less than 30, the cut resistance of the sidewall rubber unfavorably and rapidly lowers.

EXAMPLES 28~29

Each of five rubber compositions having a compounding recipe as shown in the following Table 15 was prepared in a Banbury mixer. Then, a radial tire for passenger car having a tire size of 195/70 HR 14 was manufactured by applying each of the above five rubber compositions to each of five parts equally divided on the circumference of the tire tread. The weather resistance, thermal aging resistance, resistance to crack growth, wear resistance and adhesion to diene rubber were evaluated with respect to the resulting tire to obtain results as shown in Table 15. In this case, the thermal aging resistance was measured in the same manner as described in Example 1, the weather resistance was measured in the same manner as described in Example 5, and the other properties were measured as follows.

(1) Resistance to crack growth

After five scratches of 2 mm in width and 1.0 mm in depth were formed on the groove bottom of each of five divided tread parts, the tire was run on an indoor drum tester at a speed of 65 km/hr under an internal pressure of 1.7 kg/cm² and a JIS 100% load, during which a time till the scratch length grew to 1.5 cm was measured. The resistance to crack growth was evaluated according to the following equation:

$$\text{Resistance to crack growth(index)} = \frac{\text{Time of test piece}}{\text{Time of control}} \times 100$$

The larger the numerical value, the better the property.

(2) Wear resistance

After the tire was actually run over a distance of 20,000 km, the depth of the remaining groove was measured at four positions, from which an average value was calculated. Then, a worn amount was calculated by (initial groove depth—average groove depth after running). The wear resistance was evaluated according to the following equation:

$$\text{Wear resistance(index)} = \frac{\text{Worn amount of control}}{\text{Worn amount of test piece}} \times 100$$

The larger the numerical value, the better the property.

(3) Adhesion to diene rubber

After the tire subjected to an internal pressure of 1.7 kg/cm² was run on an indoor drum tester provided with protrusions at a speed of 65 km/hr under a JIS 150% load over a distance of 150,000 km, the presence of peeling between the tire tread rubber and a tire tread base rubber having a compounding recipe as shown in the following Table 14 was observed, wherein smooth peeling at interface was evaluated as unacceptable and no smooth peeling was evaluated as good.

TABLE 14

| Natural rubber (NR) | 80 | parts by weight |
|---|---|---|
| Polybutadiene rubber (BR) | 20 | |
| Carbon black HAF | 35 | |
| Santoflex 13 | 1 | |
| Stearic acid | 2 | |
| ZnO | 5 | |
| CZ | 1.0 | |
| Sulfur | 2.5 | |

TABLE 15

|  | Comparative Example 30 | Comparative Example 31 | Comparative Example 32 | Example 28 | Example 29 |
|---|---|---|---|---|---|
| Natural rubber | 50 | 50 | 50 | 50 | 50 |
| BRO1 | 50 | — | — | — | — |
| EP43 | — | 50 | — | — | — |
| EP33 | — | — | 50 | — | — |
| Sample-1 | — | — | — | 65 | — |
| Sample-11 | — | — | — | — | 70 |
| Carbon black ISAF | 55 | 55 | 55 | 55 | 55 |
| Aromatic oil | 15 | 15 | 15 | — | — |
| Stearic acid | 2 | 2 | 2 | 2 | 2 |
| Santoflex 13 | 1 | — | — | — | — |
| Paraffin wax | 1 | — | — | — | — |
| ZnO | 3 | 3 | 3 | 3 | 3 |
| CZ | 0.5 | 0.8 | 0.8 | 0.8 | 0.8 |
| TS | 0.2 | 0.2 | 0.2 | 0.2 | 0.2 |
| Sulfur | 1.5 | 1.5 | 1.5 | 1.5 | 1.5 |
| Weather resistance | frequent-occurred | * | none | none | none |
| Thermal aging resistance | 100 | 130 | 125 | 139 | 138 |
| Resistance to crack growth | 100 | 35 | 45 | 186 | 145 |
| Wear resistance | 100 | 45 unacceptable | 56 unacceptable | 100 | 98 |
| Adhesion to diene rubber | — | able | able | good | good |

*No small crack occurred, but two large cracks (length: 1.8–2.5 cm) occurred.

As seen from Table 15, the resistance to crack growth, wear resistance and adhesion to diene rubber are considerably improved in the rubber composition containing not less than 20 parts by weight of the E/P rubber according to the invention as compared with the rubber composition containing the same amount of the conventional EPDM rubber.

EXAMPLES 30~34

A radial tire for passenger car having a tire size of 165 SR 13 was manufactured by applying each of five rubber compositions having a compounding recipe as shown in the following Table 16 to each of five parts equally divided on the circumference of the tire tread, and then the resistance to crack growth and wear resistance were measured in the same manner as described in Example 28 together with the roll processability and dispersibility of carbon black to obtain results as shown in Table 16.

TABLE 16

|  | Example 30 | Example 31 | Example 32 | Example 33 | Example 34 |
|---|---|---|---|---|---|
| Natural rubber | 60 | 60 | 60 | 60 | 60 |
| Sample-1 | 52 | 52 | 52 | 52 | 52 |
| Carbon black SAF | 60 | — | — | — | — |
| Carbon black LS-ISAF | — | 60 | — | — | — |
| Carbon black ISAF | — | — | 60 | — | — |
| Carbon black N-231 | — | — | — | 60 | — |
| Carbon black HAF | — | — | — | — | 60 |
| Aromatic oil | 15 | 15 | 15 | 15 | 15 |
| Stearic acid | 2 | 2 | 2 | 2 | 2 |
| ZnO | 3 | 3 | 3 | 3 | 3 |
| DOTG | 0.5 | 0.5 | 0.5 | 0.5 | 0.5 |
| DM | 0.6 | 0.6 | 0.6 | 0.6 | 0.6 |
| Sulfur | 1.5 | 1.5 | 1.5 | 1.5 | 1.5 |
| Resistance to crack growth | 101 | 96 | 100 | 114 | 100 |
| Wear resistance | 115 | 88 | 100 | 96 | 85 |
| Roll processability | acceptable | acceptable | good | good | good |
| Dispersibility of carbon black | acceptable | slightly bad | good | acceptable | good |

EXAMPLES 35~37

A radial tire for passenger car having a tire size of 175 SR 14 was manufactured by applying each of three rubber compositions having a compounding recipe as shown in the following Table 17 to each of three parts equally divided on the circumference of the tire tread, and then the hardness and cornering stability were measured to obtain results as shown in Table 17. Moreover, the cornering stability was evaluated by a feeling of a driver when the tire was actually run on a circuit course and a slalom course.

TABLE 17

|  | Example 35 | Example 36 | Example 37 |
|---|---|---|---|
| Natural rubber | 20 | 20 | 20 |
| Sample-1 | 104 | 104 | 104 |
| Carbon black ISAF | 45 | 50 | 60 |
| Aromatic oil | 15 | 15 | 10 |
| Stearic acid | 2 | 2 | 2 |
| ZnO | 3 | 3 | 3 |
| DOTG | 0.5 | 0.5 | 0.5 |
| DM | 0.6 | 0.6 | 0.6 |
| Sulfur | 1.5 | 1.8 | 2.0 |
| Hardness | 54 | 58 | 67 |
| Cornering stability | bad | good | good |

As seen from the results on the cornering stability in Table 17, the hardness of the tread rubber after vulcanization (JIS spring type hardness, type A) is preferable to be not less than 55 for the improvement of the cornering stability.

As mentioned above, in the rubber composition using the E/P rubber satisfying all of the requirements (1)~(7) according to the invention, the resistance to crack growth, wear resistance, strength at break, elongation at break and adhesion to diene rubber are considerably improved as compared with the rubber composition using the conventional EPDM rubber.

Furthermore, when the rubber composition according to the invention is applied to the tire sidewall, the appearance is considerably improved. Moreover, when it is applied to the tire tread, the appearance and the resistance to groove cracking are considerably improved and the retreading life of large size tire is remarkably prolonged. Particularly, the rubber compositions according to the invention are applicable to general rubber articles such as industrial belt, hose, rubber vibration isolator, marine fender and the like in addition to the pneumatic tires. Although a blend of ethylene-propylene series rubbers may be used as an E/P rubber for satisfying the requirements (1)~(7), the use of rubber polymerized so as to simultaneously satisfy all of the requirements (1)~(7) exhibits more excellent properties such as resistance to crack growth, wear resistance and the like.

What is claimed is:

1. A pneumatic tire comprising a tread, sidewalls and bead portions; said sidewall being constructed by using a rubber composition comprising not less than 20 parts by weight of a rubber consisting essentially of an interpolymer of ethylene, propylene and diene and satisfying all of the following requirements:
   (1) a glass transition temperature of not higher than $-50°$ C. as measured by a differential scanning calorimeter;
   (2) an iodine value of 10~34;
   (3) a weight-average molecular weight of not less than 220,000;
   (4) an ethylene content of 68~85 mol %;
   (5) a molecular weight distribution ($\overline{M}w/\overline{M}n$) of not less than 3.0;
   (6) $95 \leq 1.5 \times$ (iodine value) + (ethylene content) $\leq 120$; and
   (7) $90 \leq$ (weight-average molecular weight) $\times 10^{-4}$ + (ethylene content) $\leq 110$ , not less than 10 parts by weight of an isoprene rubber, not less than 10 parts by weight of a process oil and 20~100 parts by weight of an inorganic filler based on 100 parts by weight of rubber content.

2. The pneumatic tire according to claim 1, wherein said rubber composition has a hardness after vulcanization (JIS spring type hardness, type A) of 30~60.

3. The pneumatic tire according to claim 1, wherein said rubber consisting essentially of an interpolymer of ethylene, propylene and diene is compounded in an amount of not less than 30 parts by weight.

4. The pneumatic tire according to claim 1, wherein said diene is ethylidene norbornene.

5. The pneumatic tire according to claim 1, wherein said rubber consisting essentially of an interpolymer of ethylene, propylene and diene is extended with an oil.

6. The pneumatic tire according to claim 1, wherein said inorganic filler is carbon black, silicon dioxide, calcium carbonate or titanium dioxide.

7. The pneumatic tire according to claim 1, wherein at least 60% of said process oil is an oil used for extending rubber contained in said rubber composition.

8. The pneumatic tire according to claim 1, wherein at least 60% of said process oil is an oil used for extending said rubber consisting essentially of an interpolymer of ethylene, propylene and diene.

9. The pneumatic tire according to claim 5, wherein said oil is a paraffinic oil.

10. The pneumatic tire according to claim 5, wherein said oil is used in an amount of not less than 20 parts by weight.

11. The pneumatic tire according to claim 6, wherein said carbon black has an iodine absorption value of 35~100 mg/g and a DBP oil absorption of 70~140 ml/100 g.

12. A pneumatic tire comprising a tread, sidewalls and bead portions; said tread being constructed by using a rubber composition comprising not less than 20 parts by weight of an interpolymer of a rubber composed mainly of ethylene, propylene and diene and satisfying all of the following requirements:

(1) a glass transition temperature of not higher than −50° C. as measured by a differential scanning calorimeter;
(2) an iodine value of 10~34;
(3) a weight-average molecular weight of not less than 220,000;
(4) an ethylene content of 68~85 mol %;
(5) a molecular weight distribution ($\overline{M}w/\overline{M}n$) of not less than 3.0;
(6) $95 \leq 1.5 \times$(iodine value)+(ethylene content)$\leq 120$; and
(7) $90 \leq$(weight-average molecular weight)$\times 10^{-4}$+(ethylene content)$\leq 110$ , not less than 10 parts by weight of a process oil and 50~150 parts by weight of an inorganic filler based on 100 parts by weight of rubber content.

13. The pneumatic tire according to claim 12, wherein said rubber composition has a hardness after vulcanization (JIS spring type hardness, type A) of 55~70.

14. The pneumatic tire according to claim 12, wherein said rubber consisting essentially of an interpolymer of ethylene, propylene and diene is compounded in an amount of not less than 30 parts by weight.

15. The pneumatic tire according to claim 12, wherein said diene is ethylidene norbornene.

16. The pneumatic tire according to claim 12, wherein said rubber consisting essentially of an interpolymer of ethylene, propylene and diene is extended with an oil.

17. The pneumatic tire according to claim 12, wherein said inorganic filler is carbon black, silicon dioxide, calcium carbonate or titanium dioxide.

18. The pneumatic tire according to claim 12, wherein at least 60% of said process oil is an oil used for extending rubber contained in said rubber composition.

19. The pneumatic tire according to claim 12, wherein at least 60% of said process oil is an oil used for extending said rubber consisting essentially of an interpolymer of ethylene, propylene and diene.

20. The pneumatic tire according to claim 16, wherein said oil is a paraffinic oil.

21. The pneumatic tire according to claim 16, wherein said oil is used in an amount of not less than 20 parts by weight.

22. The pneumatic tire according to claim 17, wherein said carbon black has an iodine absorption value of 85~200 mg/g and a DBP oil absorption of 100~180 ml/100 g.

* * * * *